(12) United States Patent
Shires

(10) Patent No.: US 9,842,489 B2
(45) Date of Patent: Dec. 12, 2017

(54) WAKING OTHER DEVICES FOR ADDITIONAL DATA

(71) Applicant: Google Inc., Mountain View, CA (US)

(72) Inventor: Glen Shires, Danville, CA (US)

(73) Assignee: GOOGLE LLC, Mountain View, CA (US)

( * ) Notice: Subject to any disclaimer, the term of this patent is extended or adjusted under 35 U.S.C. 154(b) by 224 days.

(21) Appl. No.: 13/766,878

(22) Filed: Feb. 14, 2013

(65) Prior Publication Data
US 2014/0229184 A1    Aug. 14, 2014

(51) Int. Cl.
| | |
|---|---|
| *G10L 15/26* | (2006.01) |
| *G08C 17/00* | (2006.01) |
| *H04L 12/12* | (2006.01) |
| *G10L 15/32* | (2013.01) |
| *H04L 12/28* | (2006.01) |
| *G10L 15/30* | (2013.01) |

(52) U.S. Cl.
CPC .............. *G08C 17/00* (2013.01); *G10L 15/32* (2013.01); *H04L 12/12* (2013.01); *H04L 12/282* (2013.01); *G08C 2201/12* (2013.01); *G08C 2201/32* (2013.01); *G10L 15/30* (2013.01); *Y02B 60/34* (2013.01)

(58) Field of Classification Search
None
See application file for complete search history.

(56) References Cited

U.S. PATENT DOCUMENTS

| | | | | |
|---|---|---|---|---|
| 6,219,645 | B1 * | 4/2001 | Byers ..................... | G10L 15/02 381/91 |
| 7,072,697 | B2 * | 7/2006 | Lappetelainen .. | H04W 52/0229 455/343.5 |
| 7,774,204 | B2 * | 8/2010 | Mozer ..................... | G10L 15/26 315/307 |
| 8,340,975 | B1 * | 12/2012 | Rosenberger ........... | G10L 15/22 704/270 |
| 9,043,210 | B1 * | 5/2015 | Adcock ................. | G10L 15/183 379/88.01 |
| 2002/0178003 | A1 * | 11/2002 | Gehrke ................. | G06F 17/277 704/235 |
| 2003/0144837 | A1 * | 7/2003 | Basson ................... | G10L 15/32 704/231 |
| 2008/0167868 | A1 * | 7/2008 | Kanevsky ............... | G10L 15/20 704/233 |

(Continued)

FOREIGN PATENT DOCUMENTS

| | | |
|---|---|---|
| CN | 101266791 A | 9/2008 |
| CN | 102323853 A | 1/2012 |

OTHER PUBLICATIONS

ISR of PCT/US2014/015964 dated Apr. 28, 2014.
Office Action dated Mar. 10, 2017 as received in CN Application No. 201480021305.9.

*Primary Examiner* — Edwin S Leland, III
(74) *Attorney, Agent, or Firm* — Morris & Kamlay LLP

(57) ABSTRACT

The disclosed subject matter provides a main device and at least one secondary device. The at least one secondary device and the main device may operate in cooperation with one another and other networked components to provide improved performance, such as improved speech and other signal recognition operations. Using the improved recognition results, a higher probability of generating the proper commands to a controllable device is provided.

19 Claims, 3 Drawing Sheets

(56) References Cited

U.S. PATENT DOCUMENTS

| | | | |
|---|---|---|---|
| 2008/0228493 A1* | 9/2008 | Hu | G10L 15/32 |
| | | | 704/275 |
| 2011/0298967 A1* | 12/2011 | Clavin | G06F 1/3231 |
| | | | 348/372 |
| 2011/0301952 A1* | 12/2011 | Koshinaka | G10L 15/32 |
| | | | 704/235 |
| 2012/0151519 A1* | 6/2012 | Guichard | H04L 63/0853 |
| | | | 725/31 |
| 2013/0080179 A1* | 3/2013 | White | G10L 15/22 |
| | | | 704/275 |
| 2015/0228274 A1* | 8/2015 | Leppanen | G10L 15/20 |
| | | | 704/243 |

* cited by examiner

US 9,842,489 B2

WAKING OTHER DEVICES FOR ADDITIONAL DATA

BACKGROUND

Devices are available that remain in a low power state until needed. Signals, such as clapping of hands, may be received by the device to transition from the low power state to a high power state in order to perform some function. Commonly, the lower power devices provide a specific function, such as a switch to turn on lights, or to provide an input to a system. These devices typically do not operate in cooperation with other devices to provide an enhanced recognition of input commands or provide improved system performance.

BRIEF SUMMARY

According to an implementation of the disclosed subject matter, a method may be provided that includes receiving a trigger input signal. In response to receiving the trigger input signal, a main device may output a wake-up signal to a secondary device. The main device may receive an input signal from the secondary device and an input signal from a main device sensor. A command signal may be generated in response to the main device and secondary device input signals.

According to an implementation of the disclosed subject matter, a system including a main device may be provided. The main device may include a long-duration power supply, a sensor and a processor. The processor may be configured to receive a trigger input signal from an external device. The processor may be further configured to output a wake-up signal to a secondary device. The processor may receive an input signal from the secondary device and an input signal from the main device sensor. In response to the main device and the secondary device input signals, the processor may generate a command signal to perform an action related to the recognized input signals.

According to an implementation of the disclosed subject matter, a system may be provided that includes a main device and a secondary device. The main device may include a long-duration power supply, a sensor and a processor. The processor may be configured to send a wake-up signal to the secondary device in response to receiving a trigger signal. The secondary device may include a short-duration power supply, a sensor, a memory, and a processor. The processor may be configured to enable transmission of input signals detected by the secondary device sensor in response to receiving the wake-up signal from the main device.

Additional features, advantages, and implementations of the disclosed subject matter may be set forth or apparent from consideration of the following detailed description, drawings, and claims. Moreover, it is to be understood that both the foregoing summary and the following detailed description includes examples that are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
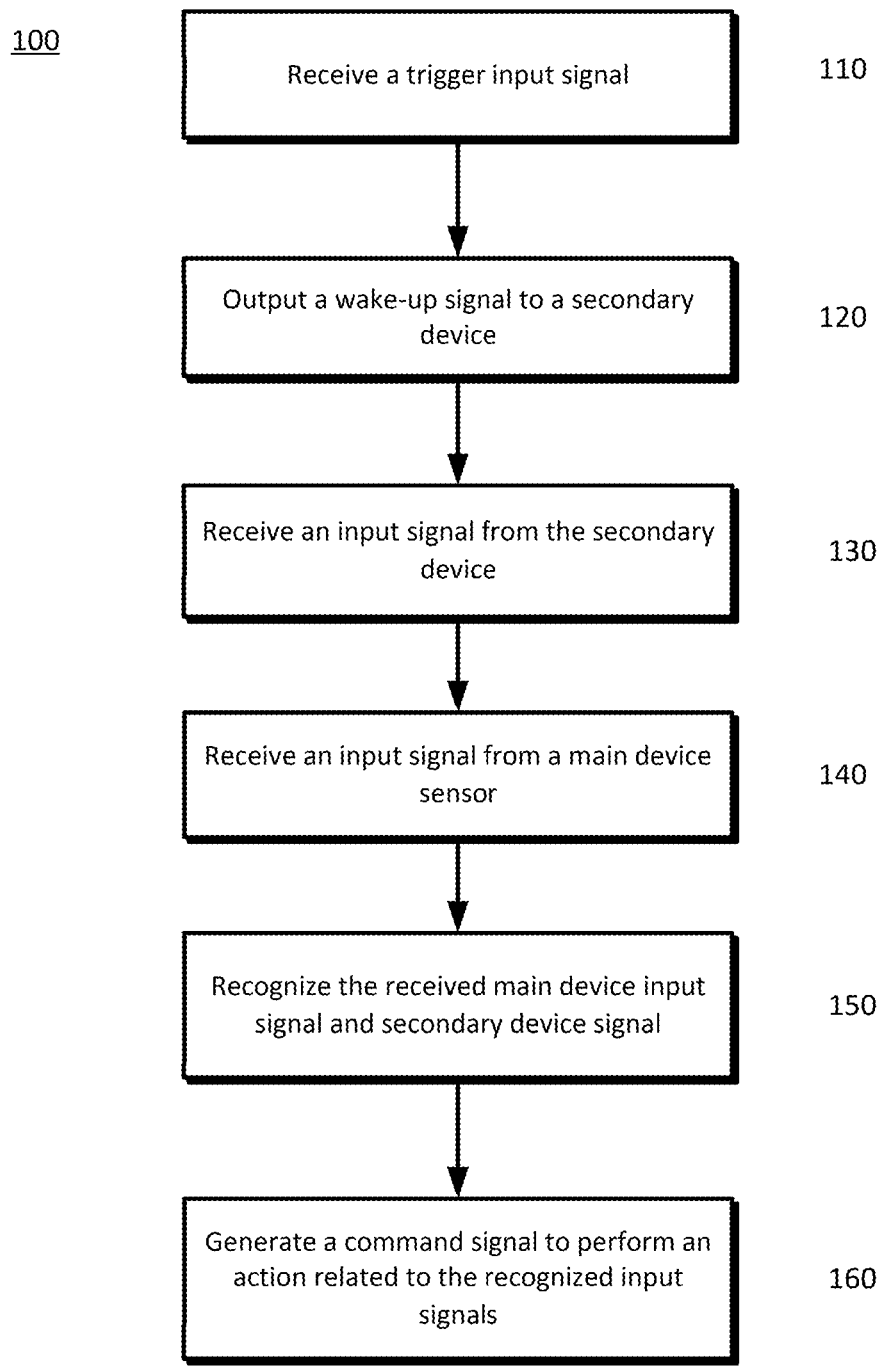
FIG. 1 shows a flowchart according to an implementation of the disclosed subject matter.

A number of devices may operate in cooperation to provide an enhanced recognition of an input. A main, or primary, device and at least one secondary device may operate in cooperation with one another to control devices within an environment. The main device and the secondary device may be co-located with one another in an environment, such as a room, office space, automobile, auditorium, outdoor area or the like. Each of the main and secondary devices in the environment may have sensors that detect inputs from the environment. Multiple samples of the inputs may be obtained from all of the main and secondary device sensors. Using the multiple detected inputs, a processor may provide improved recognition results of the detected inputs to arrive at an improved recognition result. For example, a main device may include an audio system controller that responds to voice commands. It may include a microphone to receive the voice commands. A secondary device may be a smaller, battery operated device that includes a transmitter and a microphone. Both the main device and the secondary device may receive the voice commands. The secondary device may forward signals related to the voice commands it detects to the main device. The main device may use the voice commands received from the secondary device to augment the processing of the voice commands received by the main device microphone. Using the combination of inputs, the main device may provide a recognition result with greater probability.

The main device may receive a signal indicating that a user is in proximity to the main device, and may enable sensors to detect an input signal from the environment. The main device may transmit a wake-up signal to alert secondary devices to enable their sensors to also begin detecting input signals from the environment. In response, the secondary devices may detect input signals that supplement input signals received by the main device. The detected input signals from the main device and the secondary devices may be recognized by recognition algorithms. The combination of input signals may allow for an improved recognition result. Using the recognized input signals, user command inputs may be recognized and command signals may be generated. With regard to a power supply, the main device may have an AC power source that can be plugged into a wall and positioned in an inconspicuous place in a room. Alternatively, since the main device may monitor the environment for input signals more often, or for longer periods of time, than the secondary device, the main device may be battery powered with a battery having sufficient power to power the main device for an extended duration, such as 12-24 hours. Meanwhile, the battery life of the secondary device battery may be less than the main device battery since it may not operate for as long a period of time, or as frequently. For example, the main device may be a smart phone, and the secondary device may be a small, battery-operated table top device or wall-mountable device that has sensors contained within it. The sensors in both devices may be a microphone, an IR detector, an RF detector and combinations thereof. For example, the smartphone may execute an application that allows the smartphone to control devices, such as audio devices, televisions and the like, and appliances, such as air conditioners, heaters, refrigerators, ovens and the like. The control inputs to the application may be, for example, voice commands. The smartphone may continuously, or frequently, output trigger signals to wake up secondary devices within a certain distance, for example, 10-25 feet, of the smartphone. Both the smartphone and the secondary devices may detect the voice command input signals. The secondary devices may provide the detected voice commands input signals to the smartphone, controller, remote server or a combination. The detected voice command signals may be provided to a controller or remote server for recognition of the voice commands detected by both devices. In addition or alternatively, the smartphone may use the audio signals detected by its microphone in combination with the audio signals received from the secondary device to enhance the respective signals and recognize the detected voice commands. The smartphone or controller may also generate a command signal to perform the action associated with the recognized voice command.

FIG. 1 shows a flowchart of a method 100 according to an implementation of the disclosed subject matter. At step 110, a main device may receive a trigger input signal at step 110. The trigger input signal may be speech, such as at least one of a specific word, several different words or combination of words. Alternatively, or in addition to speech, the trigger signal may be an infrared signal, a radio-frequency signal, a motion or a combination thereof. The main device may cause a signal to be compared to a list of trigger input signals and determining a wake-up signal to be sent to the secondary device. The main device may make the comparison using a local memory, or transmit a signal to a controller or a cloud-based server, which may make the comparison and return a comparison result to the main device.

In response to the received trigger input signal, a wake-up signal may be output to a secondary device at 120. The wake-up signal may be an infrared signal, optical signal, a radio frequency signal or the like. In response to receiving the wake-up signal, the secondary device may transition from a low-power state to a higher power state. Using a sensor, the secondary device may detect input signals from the environment. For example, if the secondary device sensor is a microphone, the secondary device may detect speech inputs. With the transition to the higher power state, additional circuitry or sensors within the secondary device may be enabled. For example, circuitry for implementing a transmitter may be included with the secondary device. At 130, a main device or a controller may receive input signals transmitted from the secondary device. The input signals may be speech, infrared, gestures, radio frequency or the like. In another example, while the secondary device is in a low power mode it may detect input signals for a predetermined time period and buffer the detected input signal data in a memory device. The predetermined time period may depend on the data capacity of the memory device, which may have sufficient capacity to store approximately a half second (0.5 seconds) to approximately five (5) minutes of input data. In response to receiving the wake-up signal, the secondary device may begin transmitting the buffered input data prior to transmitting the input signals it is collecting in real-time. As a result, in this example, the input signals transmitted from the secondary device may have a time delay compared to a real-time input signal that may otherwise typically be received by the main device. In some implementations, such a lag may be sufficiently short that it is not perceptible to a human user. The buffered data may be used to confirm any input signals previously detected by devices, such as the main device, that were enabled prior to the particular secondary device receiving a "wake-up" signal. After the predetermined time period, the buffered data is overwritten by new input data, or deleted from the memory of the secondary devices.

The main device may also include a sensor, such as a microphone. In addition to the input signals detected by the secondary device sensors, the sensor on the main device may also receive input signals at step 140. In the above example, the input signals to the main device sensor and the secondary device sensor may be speech inputs. Of course, the sensors in both devices may be infrared or other types of sensors, and may receive these types of inputs from the environment. The main device, at step 150, may recognize the input signals received by the main device sensor(s) and may also recognize the input signals received from the secondary device. If the detected input signals are speech inputs, known speech recognition algorithms may be applied to the input signals by a processor in the main device. Alternatively, the main device may transmit detected input signals to a system controller or a remote server, which may perform the speech recognition. Regardless of where the speech recognition is performed, the system can separately recognize the input signals from each of the main device and the one or more secondary devices and provide separate recognition results for each device. Using the separate recognition results, the main device, controller, or server may verify a final recognition result. The verification may be a simple comparison. For example, if a particular recognition result (e.g., "change channel to 185") appears more often than another result (e.g., "change shades to 185"), the final recognition result may be determined to be "change channel." Of course, more sophisticated and complex recognition algorithms may or may not be used. In addition to the television, the speech commands may also be used to control other controllable devices, such as set-top boxes, lights, blinds, audio equipment and the like.

In response to the recognition result from the recognition of the main and secondary device input signals, the main device may generate a command signal to perform an action related to the recognized input signals (Step 160). For example, if a television is being operated and the final recognition result is "change channel to 185," the main device may generate a signal to change the television channel to channel number 185. To provide this functionality, the main device may have a plurality of inputs and outputs to connect via a wired connection (such as, for example, direct wired connections, or power line communications) to the television, audio devices, set-top boxes and other devices and appliances. Alternatively, the main device may have wireless communication capabilities and may be able to communicate with the television and other devices and appliances wirelessly. The main device may also be able to communication both via wired and wireless communication paths.

Figure 2:
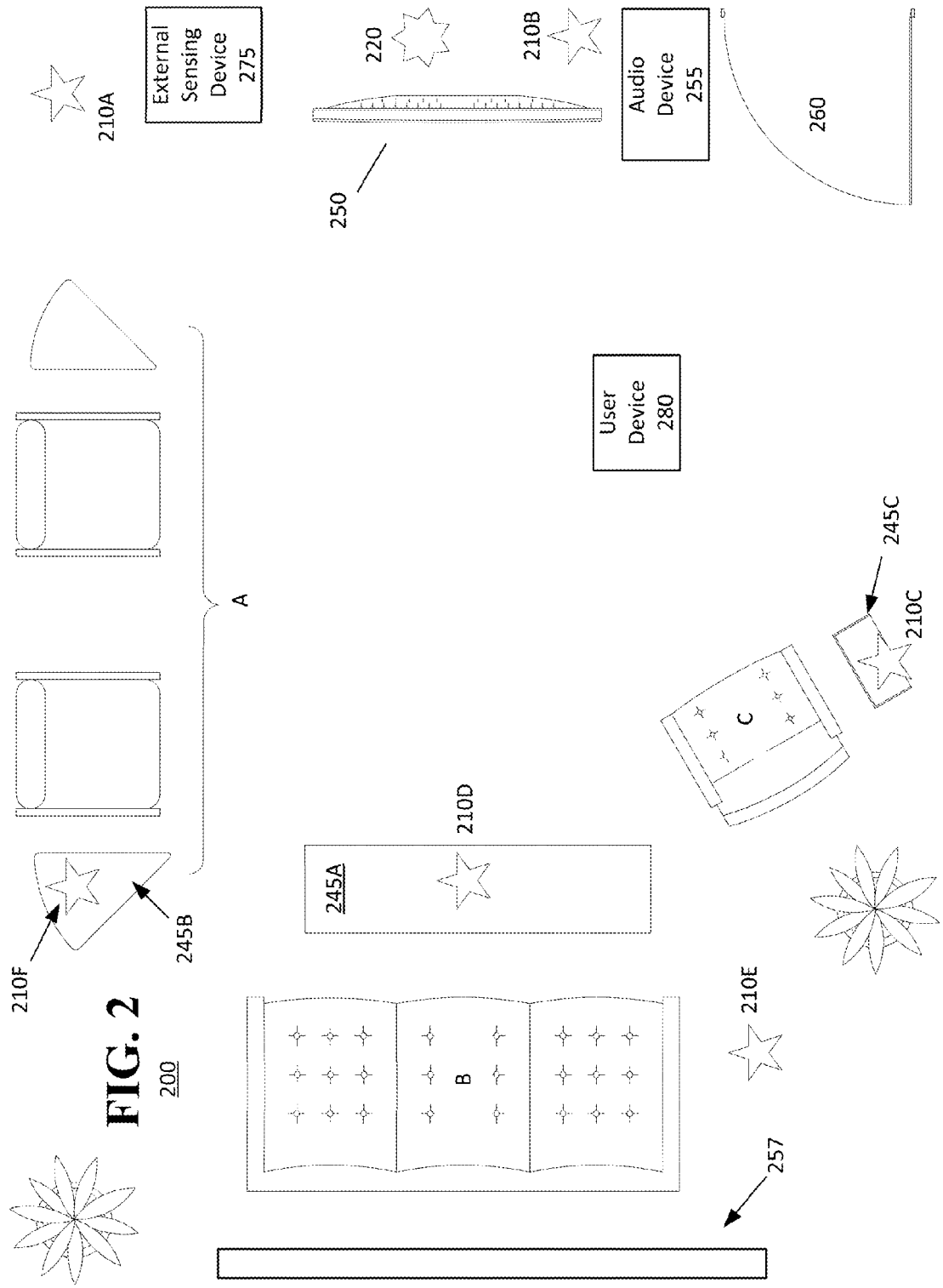
FIG. 2 shows a component layout according to an implementation of the disclosed subject matter.

An environment in which the disclosed subject matter may be utilized is shown in FIG. 2. The environment 200 may resemble a living area of a home, a lounge area in a business, an office space, or the like. The environment may include seating areas A, B and C as well as tables 245A-C, a television 250, audio system 255, window blinds 257, an entry way door 260, and at least one external sensing device 275. External sensing device 275 may be connected to a network, such as a LAN, Wi-Fi network, a cellular network, a Z-wave, a Zigbee network, home security network or the like. The external sensing device 275 may be located in any area within the environment 200, and may detect motion, NFC signals, RF signals, such as Wi-Fi, Z-wave, X-10, Zigbee and the like, infrared signals, or cellular signals. For example, external sensing device 275 may be a motion detector, such as a detector associated with a home security system, and may provide inputs to main device 220.

FIG. 2 also shows system components according to an implementation of the disclosed subject matter. The components of the system may include a main device 220 and a number of secondary devices 210A-F. The main device and the secondary devices 210A-F may be positioned throughout the environment 200. The main device 220 may include a processor, a memory, communication circuitry, at least one sensor and a long-duration power supply. For example, the main device 220 may be powered either by a constant power supply, such as an AC power source, or by a long-duration power supply, such as a battery capable of providing power for tens of hours.

The main device 220 may include connections to other devices and appliances in environment such as a television 250, an audio system 255, window blinds 257, lighting (not shown), set-top box (not shown), gaming devices (not shown), computers (not shown) and other devices or appliances. Using the connections to the other devices and appliances in the environment 200, the main device 220 may control the operation of the respective devices or appliances 250, 255, 257. The main device 220 may be positioned anywhere within the environment 200. However, an AC powered main device 220 may be positioned near AC outlets so that it may be easily plugged into the AC outlet to receive power or it may be placed on a charging pad or the like. The main device 220 may include a number of sensors. For example, the sensors may be a microphone, motion sensor, infrared (IR) sensor, and/or radio frequency sensors such as near field communication (NFC) sensors. Of course, other types of sensors may be used. The main device 220 may also include a number of communication circuits (e.g., transceivers), such as, for example, a Bluetooth transceiver, a Wi-Fi transceiver, near field communication (NFC) sensors, Z-wave, Zigbee, power line communication modems, and other radio frequency transceivers. These main device 220 transceivers may also act as sensors to detect devices, such as user device 280, attempting to connect to other devices or networks using, for example, Bluetooth or Wi-Fi signals, or to receive signals from systems such as security systems, that may have their own sensors within the environment 200. The main device 220 sensors may "always" (or periodically) be detecting inputs, e.g., speech, motion, IR signals or radio frequency signals from the environment.

The secondary devices 210A-F may include a processor, memory, communication circuitry, a power supply, and may also have sensors similar to those in the main device. However, the power source of the secondary devices 210A-F may have a shorter duration and/or lower power output than the power source of the main device 220. Power may also be provided to the secondary device using solar panels, AC power or the like. The secondary devices 210A-F may be smaller scale, low power devices and may remain in a low power, or "sleep," state to conserve power when not in use. The secondary devices 210A-F may be positioned at various places in the environment 200. For example, secondary devices 210C, 210D and 210F may be located near respective seating areas A-C, such as on tables 245A-C, to detect input signals, such as speech, from persons sitting in the seating area. Alternatively or in addition to, the secondary devices 210A, 210B and 210E may be positioned at various places around the environment 200 from which to detect inputs.

In operation, as discussed with respect to FIG. 1, the main device may be in an active or "On" state and detecting inputs and the secondary device may be in a low power state (i.e., "sleep" state). The main, or primary, device 220 may include a processor configured to respond to a received trigger signal, such as a hot word or a particular phrase, a radio frequency signal, a near field communication signal, a Bluetooth signal, a Wi-Fi signal or the like, received from an external device. For example, the trigger signal may be an NFC signal from a user device 280 that indicates to the main device 220 that a user is in the proximity and that the main device should begin expecting input command signals. In another example, the sensor on the main device 220 may be a microphone that is detecting speech in the environment 200. The speech inputs that causes a response from the main device 220 may be certain trigger signals, or words, such as a wake-up hot-word or natural language phrase detected in the environment 200.

For example, when a user enters the environment 200 and provides a "turn ON" television trigger signal, the main device 220 may output a wake-up signal. The wake-up signal may be received by the secondary devices 210A-F. The television ON command may be confirmed and a signal to turn on the television may be generated by the main device 220. When the main device 220 detects trigger signal inputs from the environment 200, it may output a wake-up signal instructing at least one of the secondary devices 210A-F to "wake-up" from the low power state and begin detecting inputs from the environment 200. The secondary device 210A-F may also have microphones and begin detecting speech in the room.

Alternatively, the trigger signals may be received from a number of different systems that are communicatively coupled to the main device 220. For example, the main device 220 may be communicatively coupled to a security system or wireless network. In an example of a security system implementation, the external sensing device 275 may be a security system motion detector that is communicatively coupled to the main device 220. The security system motion detector 275 may detect motion in the environment 200, and transmit a trigger signal to the main device 220. In response to the trigger signal, the main device 220 may generate a wake-up signal. Similarly, the external sensing device 275 may be a Bluetooth, NFC or Wi-Fi device that determines that a Bluetooth-enabled, Wi-Fi enabled, or NFC enabled device, such a user's smartphone or tablet, has entered the environment 200. For example, the external sensing device 275 may poll the environment 200 with Bluetooth, Wi-Fi or NFC signals and wait for a response. Conversely, the external sensing device 275 may detect signals in the infrared, Bluetooth, Wi-Fi or NFC frequency ranges. In response to detecting the user device polling for or responding to a Bluetooth signal, Wi-Fi access point signal or to an NFC signal, the external device 275 may transmit a trigger signal to the main device 220.

Alternatively or in addition, the main device 220 may include an infrared (IR) and/or a radio frequency (RF) sensor, and may be positioned in a location near a remote-controllable device, such as television 250, for example. When an IR or RF remote control is directed toward the television 250, the IR or RF signal may be interpreted by the main device 220 as a trigger signal. As discussed with FIG. 1, the main device 220 may generate and transmit a wake-up signal in response to the trigger signal. In addition to transmitting the wake-up signal, the main device 220 may enable other main device sensors such as a microphone. Other trigger signals may include motions or gestures. For example, the main device 220 may include a motion detector that detects motion, and generates a trigger signal. Or, a processor in the main device 220 may analyze and process the detected motion data to recognize any gestures. Alternatively, the gesture may be analyzed by a controller (not shown) or a remote server (not shown) and a recognition result returned to the main device 220. The gestures may indicate specific commands such as, for example, closing the blinds, dimming the lights, turning ON or OFF the television or a combination of actions.

In response to receiving the trigger signals, the secondary devices 210A-F may transition from a low power or "sleep" state and transition to a higher power state. In the higher power state, components, such as the sensors and transceiver, of the secondary devices 210A-F may be enabled and be operational. As mentioned above, the secondary devices 210A-F may include a memory that buffers data detected by the secondary device sensor such as a microphone, for a predetermined time period. The predetermined time may be approximately 0.5 seconds to approximately 5 minutes. The buffered data may be overwritten at the completion of each time period and deleted entirely when the secondary device is powered off, so that the data is never permanently stored. Alternatively, the secondary device 210A-F may be enabled to detect and transmit input signals detected by the sensor only upon receipt of the "wake-up" signal from the main device 220. The detected data, such as speech signals, may be transmitted by the secondary devices 210A-F without attempting to recognize the speech to the main device 220. Similarly, other types of detected inputs, such as IR or RF signals, are passed to the main device 220 for processing. The main device 220 may receive the input speech signals from the secondary devices 210A-F and begin processing the data. For example, if the input data from the secondary devices 210A-F is speech signals, the main device 220 processor may apply at least one speech recognition algorithm to the data received from the secondary devices 210A-F. The applied speech recognition algorithm may return a recognition result for the received input signals from each of the secondary devices 210A-F. In addition to the secondary device data, the main device 220 sensor may also provide input signals to the main device 220 processor. In the case of the main device 220 sensor being a microphone, speech signals may be provided to the main device 220 processor. The input signals received by the main device 220 sensor may also have a recognition algorithm applied and a recognition result may be returned. The recognition results from the received main device input signals and the received secondary device signals may be compared to one another to confirm a recognition result, or may be combined to provide enhanced signals for recognition. For example, the confirmation can be based on a voting scheme in which a number of matches for a specific recognition result are added together, weighted, or weighted and added together, and the winner is the recognition with the most votes. Alternatively, one device either the main device 220 or, for example, the secondary device 210A-F closest to the user may be considered as providing the primary recognition result and the all of the other recognition results may be used to verify that the primary recognition result is correct. Alternatively, the audio signals may be combined in a manner to enhance the signal to be used for recognition.

In an implementation, the speech detected by the main device 220 and the secondary devices 210A-F may be transmitted to a local control device (not shown), or be sent to a remote server (not shown). Upon recognition of the speech at the local control device or the remote server, command signals may be transmitted to the respective appliances (television 250, audio/entertainment device 255, gaming devices or the like (not shown)) or other devices (e.g., blinds, lighting, air conditioning, such as element 257).

Other input signals may represent user commands for controlling devices in the environment 200, and using the recognition results from the main device 220 and the secondary devices 210A-F command signals to perform an action may be generated.

In an implementation, the main device 220 may be a smartphone or tablet device, such as user device 280. User device 280 may be a remote control, smartphone, laptop, tablet computer or some other user portable device. For example, the user device 280 may announce its presence in the environment 220 using Bluetooth, Wi-Fi or NFC by sending wake-up signals to the secondary devices 210A-F as discussed above. In a specific example, user device 280, such as a smartphone, may be the main device 220 and may cause particular ones of the secondary devices 210A-F to wake-up by being within a certain range of the particular of secondary device. The certain range may be Bluetooth, or near field communication (NFC) range of one of the plurality of secondary devices 210A-F. In one implementation, one secondary device (e.g., 210B closest to entryway 260) may be awakened by the user device 280, and may signal the other secondary devices 210A, 210C-F to wake-up and begin detecting input signals.

In an implementation, the secondary devices 210A-F and the user device 280 may communicate with one another through a computer network (See FIG. 4), such as a home network, a Wi-Fi network, a local area network, a home automation network or the like. A computer application executing on the user device 280 may send signals to and receive signals from the secondary devices 210A-F.

Alternatively, the main device 220 may react to an infrared (IR) input, such as a television remote signal, by generating a wake-up signal causing multiple secondary devices 210A-F to begin detecting speech inputs. The speech inputs may then be used to send commands to the television or other systems (such as audio system).

Figure 3:
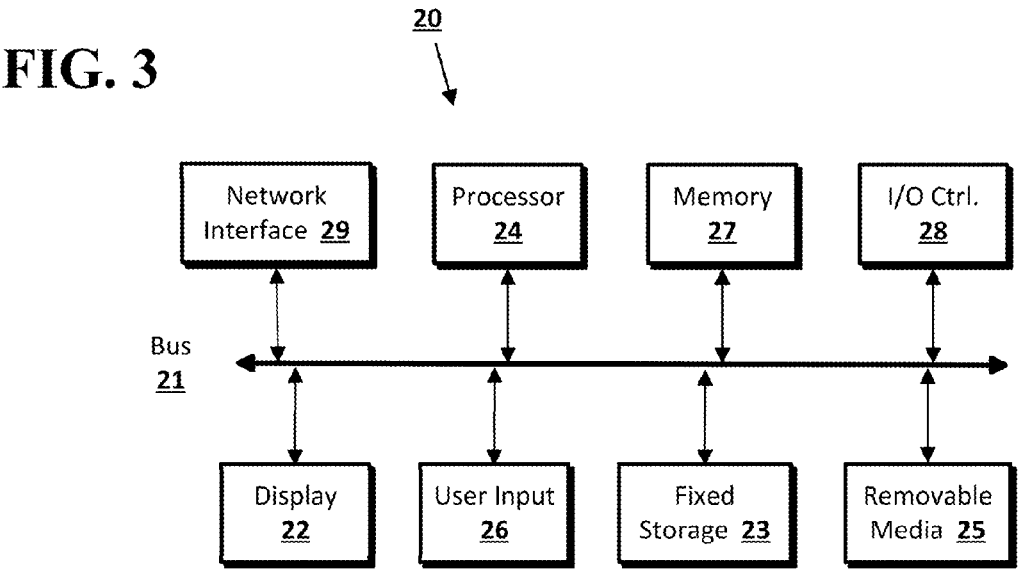
FIG. 3 shows a computer according to an implementation of the disclosed subject matter.

Implementations of the presently disclosed subject matter may be implemented in and used with a variety of component and network architectures. FIG. 3 is a computer 20 suitable for implementing implementations of the presently disclosed subject matter, such as the main device and the secondary devices. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like or sensors, such as a microphone, IR sensor, NFC sensor, Wi-Fi sensor and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, cellular connection, Wi-Fi network connections, Z-wave network connections, Zigbee network connections, security system connectivity, digital satellite data connection or the like. For example, the network interface 29 may allow the computer to communicate with other computers, appliances or devices via one or more local, wide-area, or other networks, as shown in FIG. 2.

Many other devices or components (not shown) may be connected in a similar manner (e.g., document scanners, digital cameras, televisions, audio systems, gaming systems, portable user devices, and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
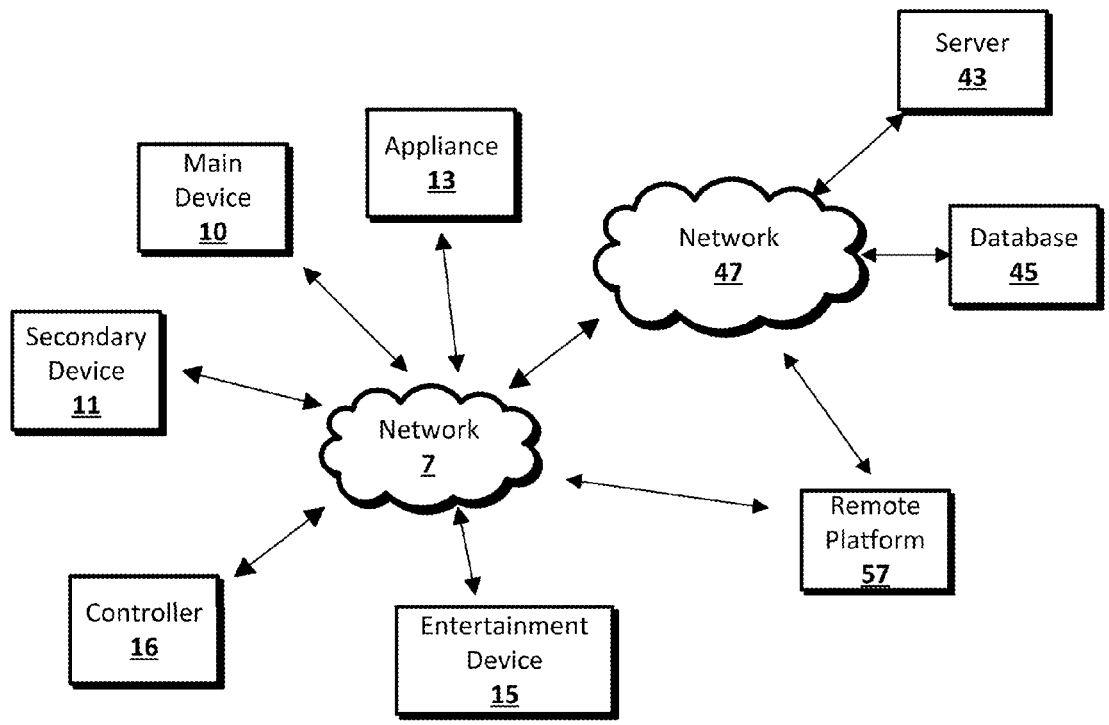
FIG. 4 shows a network configuration according to an implementation of the disclosed subject matter.

FIG. 4 shows an example network arrangement according to an implementation of the disclosed subject matter. A main device 10 and one or more secondary devices 11 as described above with respect to FIGS. 1-3 may connect to other devices via one or more networks 7 and 47. The networks 7 and 47 may be a local network, wide-area network, the Internet, or any other suitable communication network or networks, and may be implemented on any suitable platform including wired and/or wireless networks. Through network 7, the secondary devices 11 may transmit input signals to and receive wake-up and other signals from the main device 10, the controller 16, or a combination of both. The main device 10 and secondary devices 11 may communicate with one or more servers 43 and/or databases 45 through an external network 47, such as the Internet or a cellular network. A controller 16 may also connect to the network 7 and provide command signals to devices, such as appliance 13 and/or entertainment system 15. The appliances 13 may be set-top boxes, lights, blinds, televisions, computer systems, audio systems, air conditioning systems and the like. The controller 16 may also provide signal recognition services, such as speech recognition or other signal, such as IR or NFC, identification services. Alternatively, the controller 16 or main device 10 may transmit input signals to the server 43 via local network 7 and external network 47 for recognition and/or confirmation or verification. A list of hot-words and/or user commands, for example, may be stored in database 45, which may be accessed by the main device 13 or controller 16. The devices 13 and 15 may be directly accessible by the main device 10 and secondary device 11, or one or more other devices may provide intermediary access such as where a server 13 provides access to resources stored in a database 15. The main device 10 and secondary device 11 also may access or be accessed by remote platforms 57 or services provided by remote platforms 57 such as cloud computing arrangements and services. The remote platform 57 may include one or more servers 43 and/or databases 45. The remote platform 57 may also be a user device, such as a smartphone or tablet, which may communicate with the secondary device 11, controller 16, and/or server 43.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   receiving, by a main device, a trigger input signal;
   in response to the received trigger input signal, outputting a wake-up signal from the main device to a secondary device;
   receiving, by the main device from the secondary device in response to the wake-up signal, buffered input data;
   subsequent to receiving the buffered input data by the main device, receiving input signals collected in real time from the secondary device;
   receiving a signal indicating that a user is in proximity to the main device so as to enable a main device sensor of the main device;
   receiving an input signal from the main device sensor;
   separately recognizing the input signal from the main device sensor of the main device and the input signals from a secondary device using speech recognition algorithms and providing recognition results for each device, wherein the input signal from the main device sensor of the main device is recognized as a first recognition result and the input signals from the secondary device are recognized as a second recognition result;
   generating a final recognition result based on the first and second recognition results, wherein the second recognition result is used to verify the first recognition result as the final recognition result if the main device is closer to the source of the input than the secondary device, and the first recognition result is used to verify the second recognition result as the final recognition result if the secondary device is closer to the source of the input signal than the main device; and
   in response to the recognized input signals, generating a command signal to perform an action related to the recognized input signals based on the generated final recognition result.

2. The method of claim 1, further comprising:
   comparing the trigger input to a list of trigger input signals; and
   determining a wake-up signal to be sent to the secondary device.

3. The method of claim 1, further comprising:
   in response to receiving the wake-up signal, detecting input signals from the environment by the secondary device.

4. The method of claim 1, wherein the buffered input data is input data collected for a predetermined time period prior to receiving the wake-up signal.

5. The method of claim 4, wherein the predetermined time period is approximately 0.5 seconds to approximately five minutes.

6. The method of claim 1, further comprising:
   verifying a final recognition result using the recognized main device input signals and the input data from the secondary devices.

7. The method of claim 1, wherein the input signals to the main device and the secondary device are spoken language inputs.

8. The method of claim 1, wherein the trigger signal is a specific spoken word.

9. The method of claim 1, wherein the trigger signal is an infrared signal; and the input signal to the secondary device is a spoken language.

10. The method of claim 1, wherein the trigger signal is a radio-frequency signal; and
    the input signals to the main device and the secondary device are a spoken language.

11. The method of claim 1, wherein the trigger signal is a motion; and the input signals to the main device and the secondary device are a spoken language.

12. A system, comprising:
    a main device including a first-duration power supply, a sensor and a processor configured to:
      receive a trigger input signal from an external source;
      output a wake-up signal to a secondary device;
      receive, from the secondary device in response to the wake-up signal, buffered input data;
      subsequent to receiving the buffered input data, receive input signals collected in real time from the secondary device;
      receive a signal indicating that a user is in proximity to the main device so as to enable the main device sensor;
      receive an input signal from the main device sensor;
      separately recognizing the input signal from the main device sensor and the input signals from a secondary device using speech recognition algorithms and providing recognition results for each device, wherein the input signal from the main device sensor of the main device is recognized as a first recognition result and the input signals from secondary device are recognized as a second recognition result;
      generate a final recognition result based on the first and second recognition results, wherein the second recognition result is used to verify the first recognition result as the final recognition result if the main device is closer to the source of the input than the secondary device, and the first recognition result is used to verify the second recognition result as the final recognition result if the secondary device is closer to the source of the input signal than the main device; and
      in response to the recognized input signals, generate a command signal to perform an action related to the recognized input signals based on the generated final recognition result.

13. The system of claim 12, wherein the main device further comprises at least one of a Wi-Fi transceiver, a Bluetooth transceiver, or a near-field communication transceiver.

14. The system of claim 12, further comprising:
    a secondary device including a second-duration power supply, a sensor, a memory, and a processor wherein the processor is configured to:
      in response to receiving the wake-up signal from the main device, enable transmission of an input signal detected by the sensor.

15. A system, comprising:
    a main device including a first-duration power supply, a sensor and a processor configured to receive inputs and transmit signals, wherein the processor is configured to send a wake-up signal in response to receiving a trigger signal and is configured to send a signal indicating that the user is in proximity to a main device so as to enable the sensor; and
    a secondary device including a second-duration power supply, a sensor, a memory, and a processor wherein the processor is configured to, in response to receiving the wake-up signal from the main device, transmit buffered input data prior to transmitting input signals collected in real time, wherein the processor of the main device separately recognizes the input signal from the sensor and the input signals from a secondary device using speech recognition algorithms provides separate recognition results for each device, wherein the input signal from the main device sensor of the main device is recognized as a first recognition result and the input signals from secondary device are recognized as a second recognition result, wherein the processor of the main device generates a final recognition result based on the first and second recognition results, wherein the second recognition result is used to verify the first recognition result as the final recognition result if the main device is closer to the source of the input than the secondary device, and the first recognition result is used to verify the second recognition result as the final recognition result if the secondary device is closer to the source of the input signal than the main device, wherein the processor of the main device generates a command signal to perform an action related to the recognized input signals based on the generated final recognition result.

16. The system of claim 15, wherein the main device sensor and the secondary device sensor are microphones, and the main device processor is further configured to:

recognize speech received by the main device sensor; and receive audio data signals transmitted from the secondary device, wherein the audio data signals represent speech received by the secondary device sensor;

analyze the audio data signals and the recognized speech to provide an enhanced speech recognition result; and determine if the enhanced speech recognition result contains a voice command to perform an action.

17. The system of claim 15, wherein the main device sensor is a microphone, and the main device processor is further configured to:

store audio data received by the main device sensor;

receive audio data transmitted from the secondary device, wherein the audio data represent speech received by the secondary device sensor; and transmit the main device audio data and the secondary device audio data to a controller.

18. The system of claim 15, wherein the main device sensor further includes at least one of a motion sensor, an infrared sensor, a Bluetooth or near field communication detector, and the main device processor is further configured to:

generate a wake-up signal in response to a trigger signal received by the at least one of a motion sensor, an infrared sensor, a Bluetooth or near field communication detector.

19. The system of claim 15, wherein the first-duration power supply is selectable from an AC/DC wired power supply or a battery that has a longer duration than a battery in the secondary device.

* * * * *